(12) United States Patent
Kobayashi

(10) Patent No.: US 11,039,040 B2
(45) Date of Patent: Jun. 15, 2021

(54) DISPLAY DEVICE, PRINTING SYSTEM, AND NON-TRANSITORY COMPUTER READABLE MEDIUM

(71) Applicant: FUJI XEROX CO., LTD., Tokyo (JP)

(72) Inventor: Yuta Kobayashi, Kanagawa (JP)

(73) Assignee: FUJIFILM BUSINESS INNOVATION CORP., Tokyo (JP)

( * ) Notice: Subject to any disclaimer, the term of this patent is extended or adjusted under 35 U.S.C. 154(b) by 358 days.

(21) Appl. No.: 15/914,250

(22) Filed: Mar. 7, 2018

(65) Prior Publication Data

US 2019/0014236 A1      Jan. 10, 2019

(30) Foreign Application Priority Data

Jul. 5, 2017   (JP) .............................. JP2017-132091

(51) Int. Cl.
*H04N 1/62*   (2006.01)
*H04N 1/00*   (2006.01)
*H04N 1/60*   (2006.01)

(52) U.S. Cl.
CPC ............. *H04N 1/62* (2013.01); *H04N 1/0044* (2013.01); *H04N 1/00167* (2013.01); *H04N 1/00466* (2013.01); *H04N 1/6008* (2013.01); *H04N 1/6052* (2013.01); *H04N 1/622* (2013.01)

(58) Field of Classification Search
CPC .............................. H04N 1/62; H04N 1/00167
See application file for complete search history.

(56) References Cited

U.S. PATENT DOCUMENTS

| 5,335,097 A | * | 8/1994 | Murakami | ............. | H04N 1/622 |
| | | | | | 358/515 |
| 2012/0154833 A1 | | 6/2012 | Ikeda | | |
| 2015/0062654 A1 | * | 3/2015 | Ono | ....................... | B41J 2/2117 |
| | | | | | 358/2.1 |

FOREIGN PATENT DOCUMENTS

| JP | 2011-059445 A | 3/2011 |
| JP | 2012-58977 A | 3/2012 |
| JP | 2012-126021 A | 7/2012 |
| JP | 2012-145949 A | 8/2012 |

OTHER PUBLICATIONS

Mar. 23 Office Action issued in Japanese Patent Application No. 2017-132091.

* cited by examiner

*Primary Examiner* — Ibrahim Siddo
(74) *Attorney, Agent, or Firm* — Oliff PLC

(57) ABSTRACT

A display device includes an obtainer and a display controller. The obtainer obtains information on at least one special color to be printed, the information being information on the at least one special color with respect to at least one basic color. The display controller performs control to display a portion where the at least one special color is to be printed in accordance with a color value corresponding to a degree of transparency obtained from the information on the at least one special color, which is obtained by the obtainer.

8 Claims, 10 Drawing Sheets

FIG. 8

|  | BACKGROUND | FOREGROUND |
|---|---|---|
| GOLD | 0.6 | 0.9 |
| SILVER | 0.6 | 0.9 |
| CLEAR | 0.2 | 0.5 |
| WHITE | 0.3 | 0.6 |
| ORANGE | 0.5 | 0.8 |

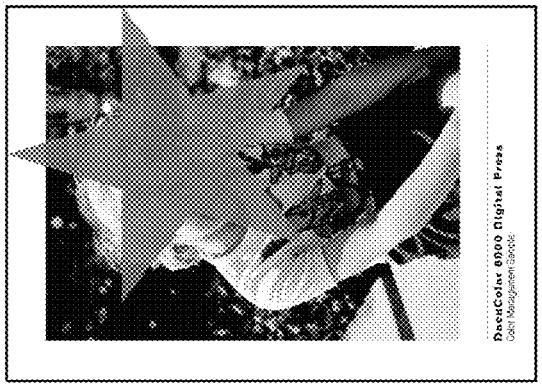
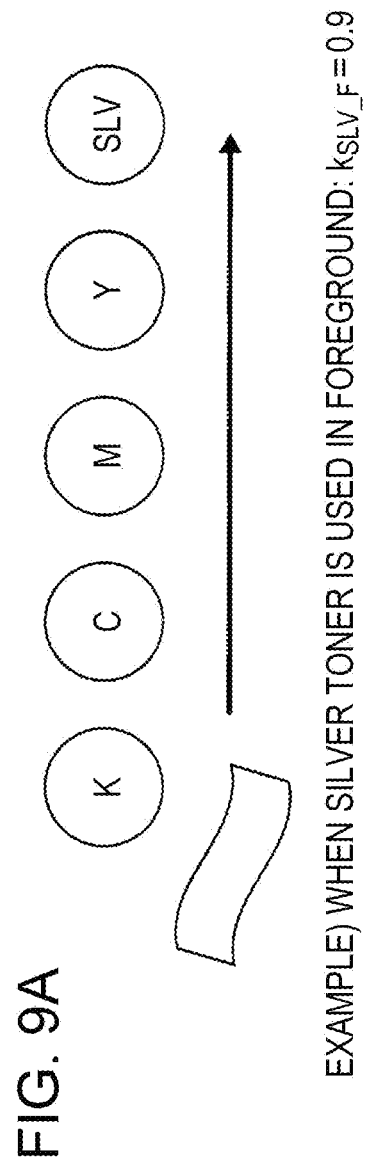
FIG. 9A
EXAMPLE) WHEN SILVER TONER IS USED IN FOREGROUND: $k_{SLV\_F} = 0.9$
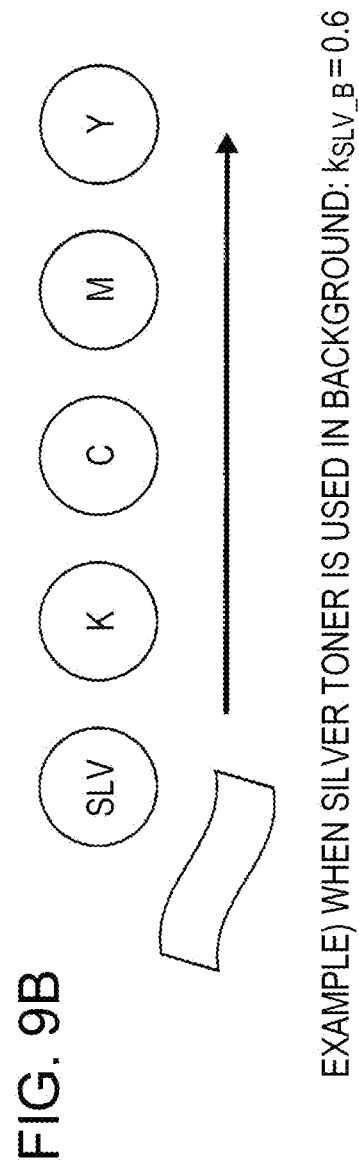
FIG. 9B
EXAMPLE) WHEN SILVER TONER IS USED IN BACKGROUND: $k_{SLV\_B} = 0.6$

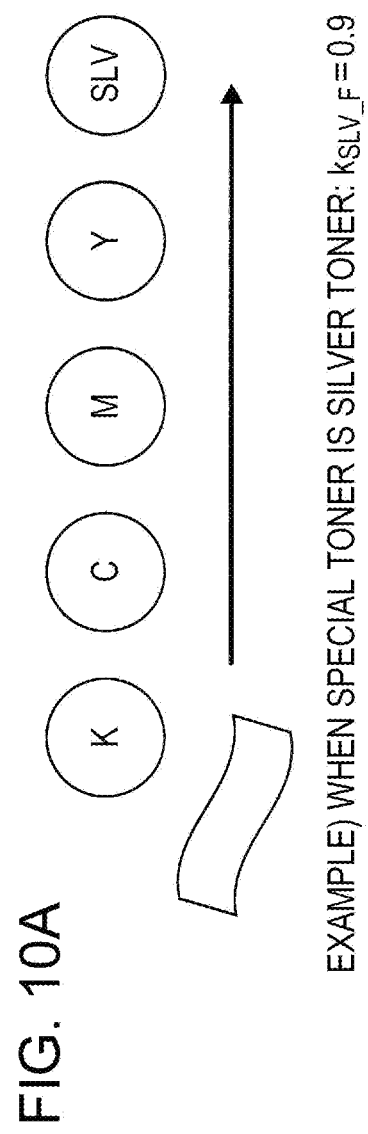
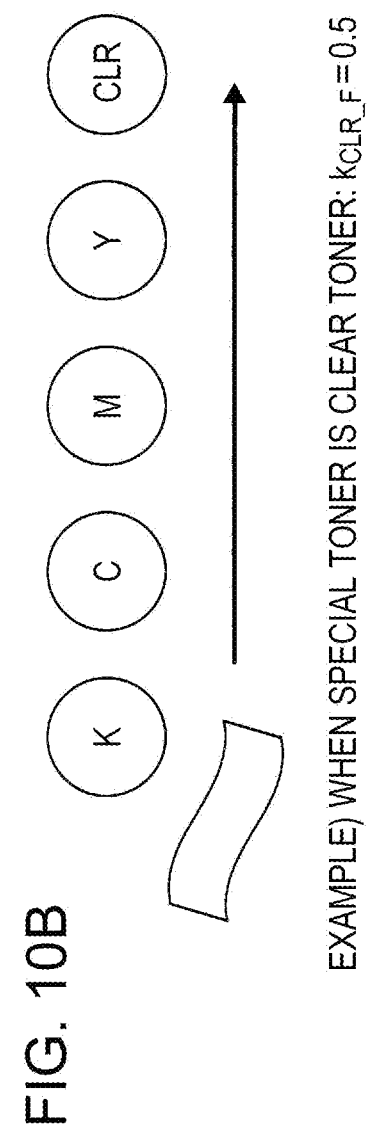
FIG. 10A  EXAMPLE) WHEN SPECIAL TONER IS SILVER TONER: $k_{SLV\_F}=0.9$
FIG. 10B  EXAMPLE) WHEN SPECIAL TONER IS CLEAR TONER: $k_{CLR\_F}=0.5$

DISPLAY DEVICE, PRINTING SYSTEM, AND NON-TRANSITORY COMPUTER READABLE MEDIUM

CROSS-REFERENCE TO RELATED APPLICATIONS

This application is based on and claims priority under 35 USC 119 from Japanese Patent Application No. 2017-132091 filed Jul. 5, 2017.

BACKGROUND

(i) Technical Field

The present invention relates to a display device, a printing system, and a non-transitory computer readable medium.

(ii) Related Art

Basic colors and special colors including clear are added together to form an image. In this case, colors in an actually printed image would differ depending on the arrangement of the special colors with respect to the basic colors (i.e., the print order of the special colors), the color values of the special colors, or other factors. However, such difference in color is difficult to represent on a preview screen.

The basic colors, which are base colors for printing, are yellow (Y), magenta (M), cyan (C), and optionally black (K). The special colors, which are colors other than the basic colors, include gold, silver, clear, white, and orange, for example.

The term "preview" refers to a function provided for displaying a final image before it is actually printed.

SUMMARY

According to an aspect of the invention, there is provided a display device including an obtainer and a display controller. The obtainer obtains information on at least one special color to be printed, the information being information on the at least one special color with respect to at least one basic color. The display controller performs control to display a portion where the at least one special color is to be printed in accordance with a color value corresponding to a degree of transparency obtained from the information on the at least one special color, which is obtained by the obtainer.

BRIEF DESCRIPTION OF THE DRAWINGS

Exemplary embodiments of the present invention will be described in detail based on the following figures, wherein:

FIG. 8 is a table illustrating examples of a coefficient in the exemplary embodiments of the present invention;

FIGS. 9A and 9B illustrate coefficients, which differ depending on the print order of special toner according to the exemplary embodiments of the present invention, when silver toner is used in the foreground and when silver toner is used in the background, respectively;

FIGS. 10A and 10B illustrate coefficients, which differ depending on the color of special toner according to the exemplary embodiments of the present invention, when silver toner is used and when clear toner is used, respectively.

DETAILED DESCRIPTION

As used herein, the term "degree of transparency", also referred to as "alpha value", refers to a value used to specify a degree of transparency for each pixel of a digital image, and the degree of transparency is separate from color information.

The term "density of a special color", as used herein, refers to gradation of a special color to be printed and corresponds to, for example, the amount of toner to be applied in xerographic printing.

The term "arrangement", as used herein, refers to the print order, and, specifically, the arrangement of a special color with respect to basic colors refers to the print order of a special color relative to basic colors.

Exemplary embodiments of the present invention will now be described in detail with reference to the drawings.

Figure 1:
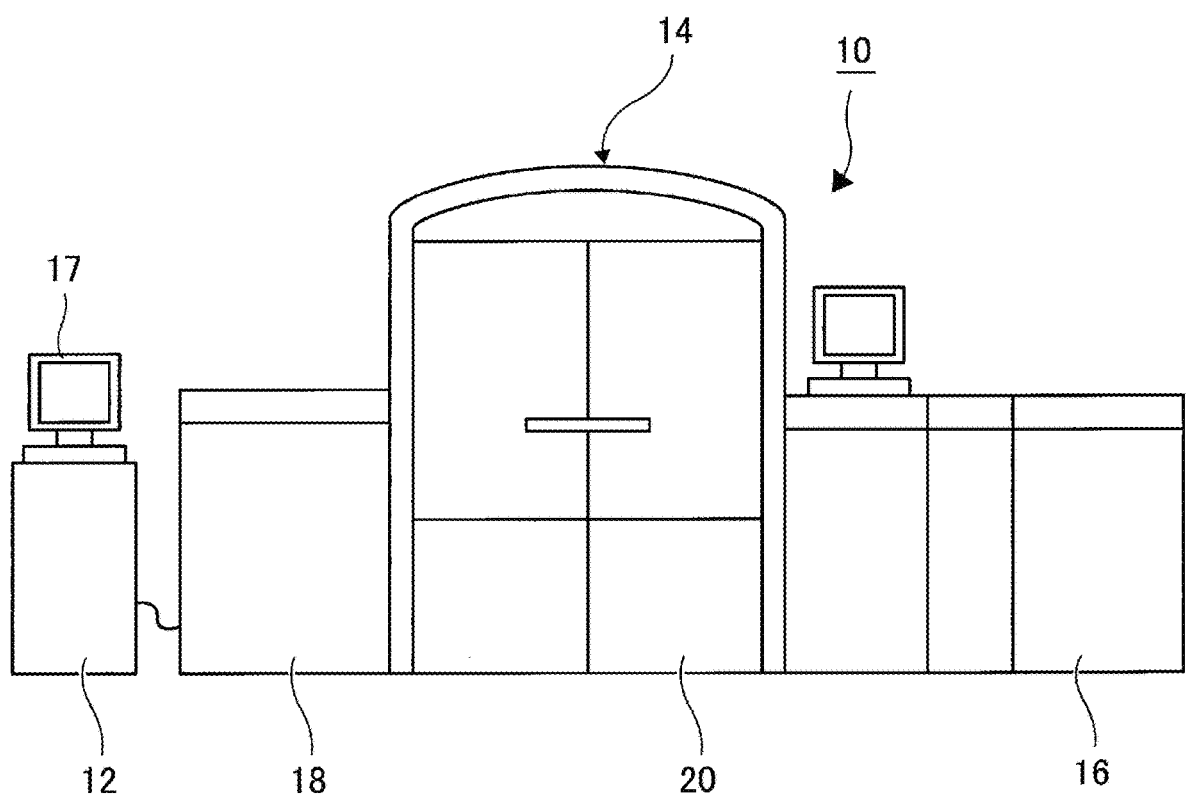
FIG. 1 is a system configuration diagram illustrating an overall printing system according to exemplary embodiments of the present invention.

FIG. 1 illustrates a printing system 10 according to an exemplary embodiment of the present invention.

The printing system 10 includes a server 12, an image forming device 14, and a post-processing device 16, which are connected to one another via a network.

The server 12 supplies image data to be used to form an image to the image forming device 14 and controls the image forming device 14 and the post-processing device 16. The server 12 is connected to a display device 17.

The image forming device 14 includes a recording medium supply section 18 and an image forming section 20.

The recording medium supply section 18 supplies a recording medium, for example, a cut sheet or a continuous sheet, to the image forming section 20.

Figure 2:
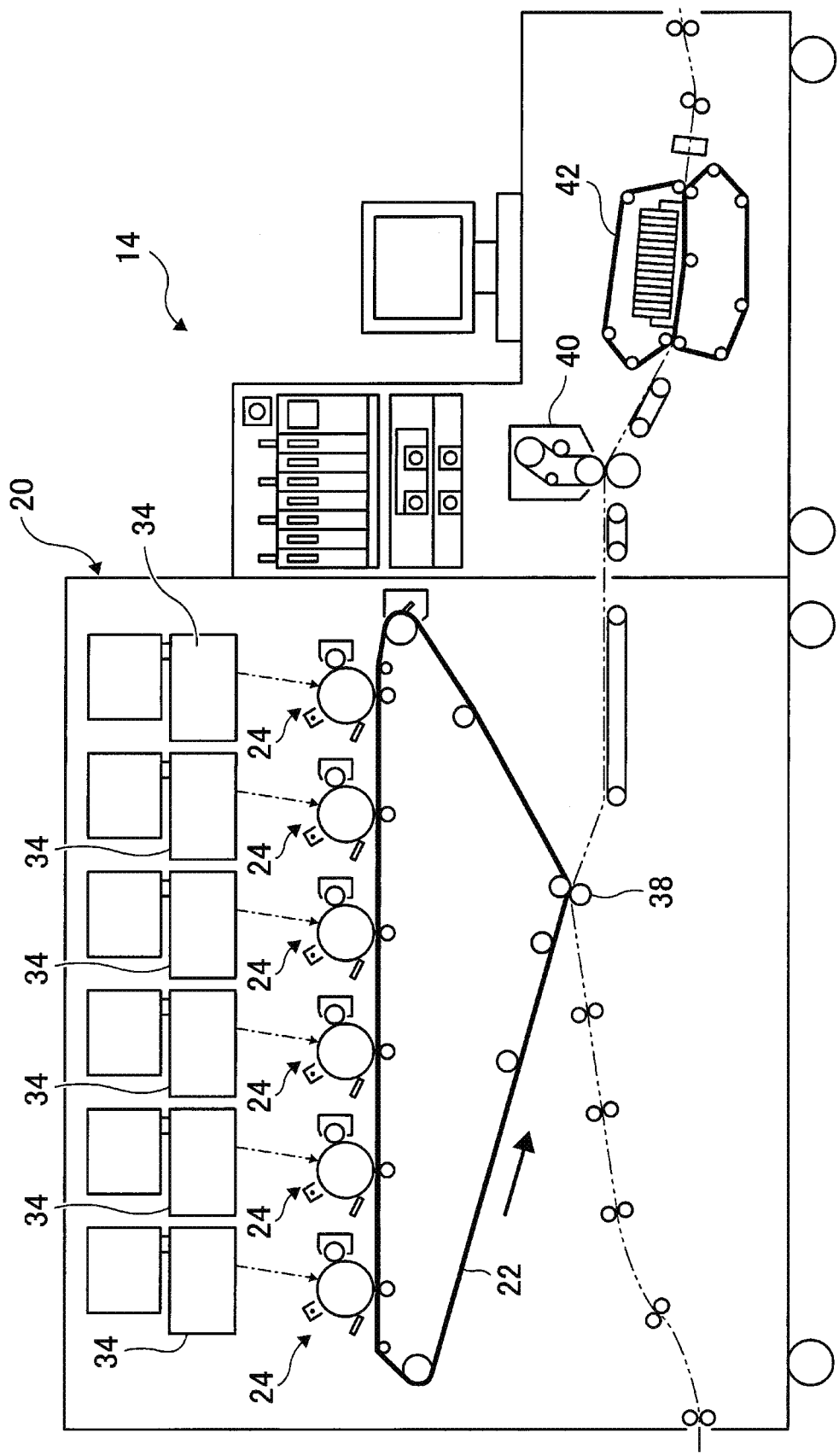
FIG. 2 is a schematic diagram illustrating an image forming device according to the exemplary embodiments of the present invention.

The image forming section 20 has a structure illustrated in FIG. 2, for example.

The image forming section 20 includes an intermediate transfer belt 22. The image forming section 20 further includes, for example, six image forming units 24 above the intermediate transfer belt 22. The image forming units 24 use toners of basic colors, i.e., cyan, magenta, yellow, and black, and special colors, namely, colors selected from among, for example, gold, silver, clear, white, and orange to form an image. The toners of the special colors are each selectable by replacing a toner container (not illustrated) for the corresponding color.

Figure 3:
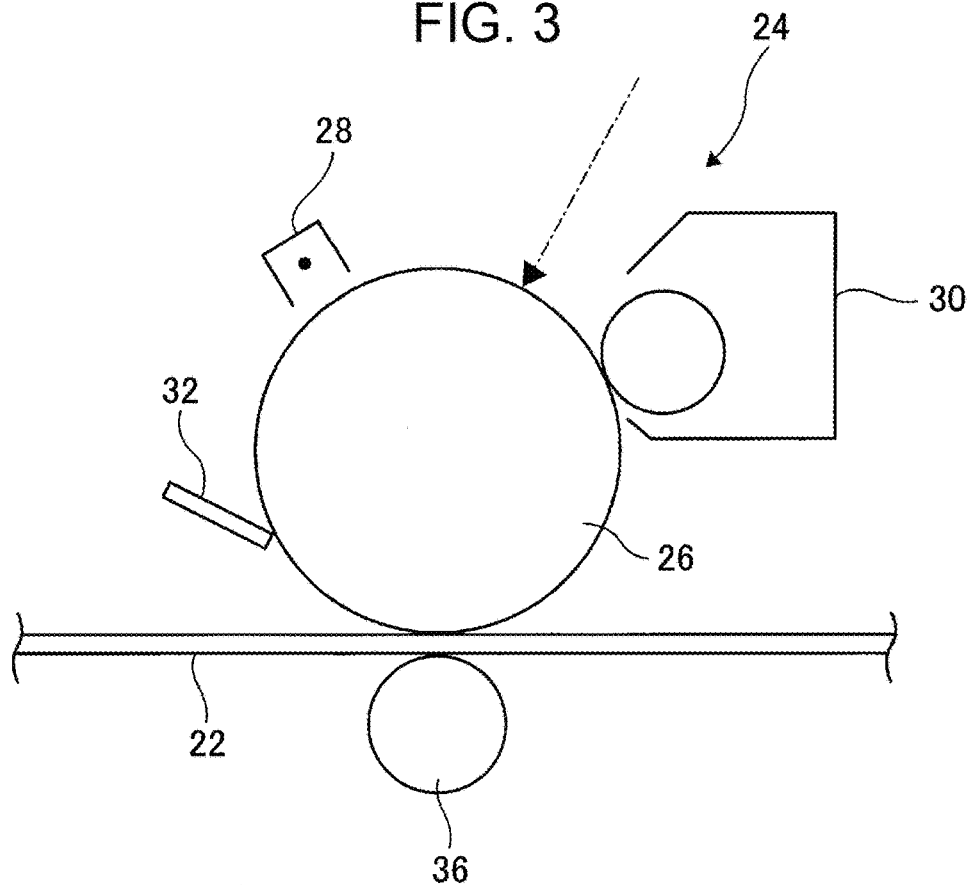
FIG. 3 is a side view of an image forming section in the image forming device according to the exemplary embodiments of the present invention.

As illustrated in FIG. 3, the image forming units 24 are based on xerography, for example, and are each constituted by a photoconductor drum 26, a charging device 28 serving as a charger that uniformly charges a surface of the photoconductor drum 26, a developing device 30 that develops an electrostatic latent image on the photoconductor drum 26, and a cleaning device 32. The photoconductor drum 26 is a cylindrical image carrier that carries a toner image (developer image). The photoconductor drum 26 is uniformly charged by the charging device 28 and is irradiated with laser light emitted by a light scanning device 34 (see FIG. 2) to form an electrostatic latent image. The electrostatic latent image formed on the photoconductor drum 26 is developed with toner by the developing device 30. A first transfer roller 36 is disposed at a position facing the photoconductor drum 26 with the intermediate transfer belt 22 interposed therebetween. The toner image developed by the developing device 30 is transferred onto the intermediate transfer belt 22 by the first transfer roller 36. After the toner image is transferred, residual toner, paper dust, and other particles remaining on the photoconductor drum 26 are removed by the cleaning device 32.

The toner images transferred onto the intermediate transfer belt 22 by the image forming units 24 are subjected to second transfer by a second transfer roller 38 to transfer the toner images onto a recording medium supplied from the recording medium supply section 18. As a result of the second transfer, an image is transferred onto the recording medium which is then conveyed to a fixing unit 40 to apply heat and pressure, for example, to fix the image. The recording medium on which the image is fixed in the way described above is then cooled by a cooling unit 42.

Figure 4:
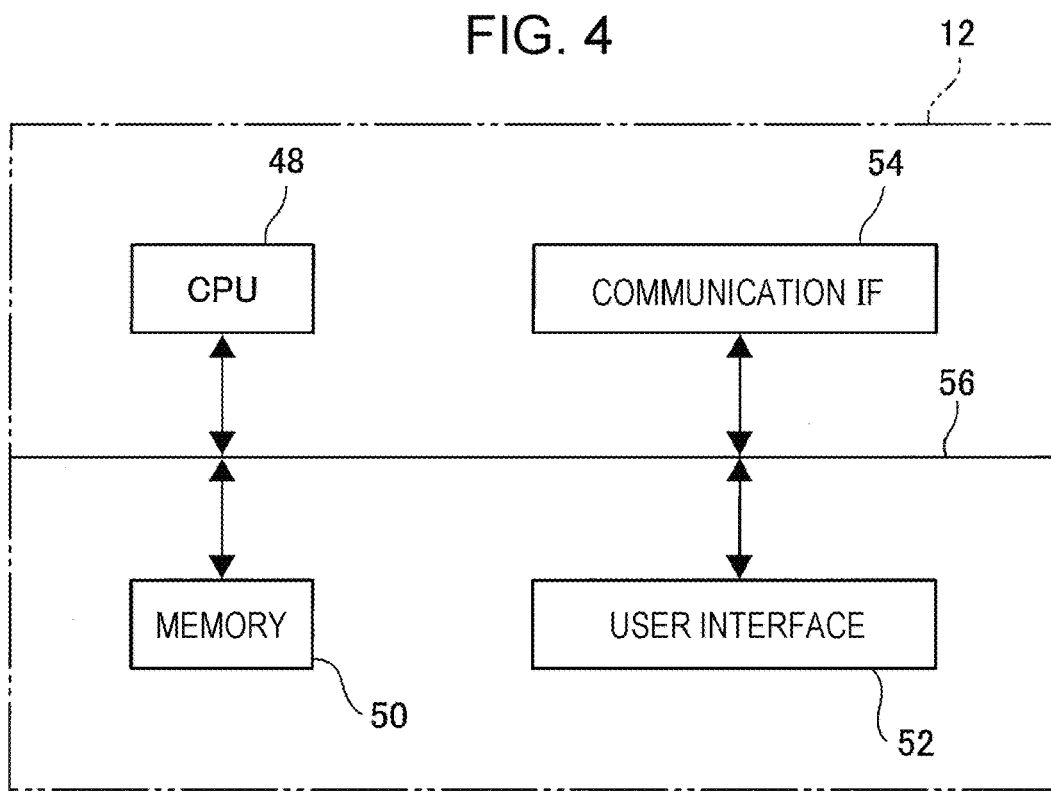
FIG. 4 is a block diagram illustrating an example circuit of a server used in the exemplary embodiments of the present invention.

As illustrated in FIG. 4, the server 12 described above includes a central processing unit (CPU) 48, a memory 50, a user interface 52, and a communication interface (IF) 54, which are connected to one another via a control bus 56.

The CPU 48 executes predetermined processing in accordance with a control program stored in the memory 50. The user interface 52 is connected to the display device 17. The display device 17 displays a preview screen that is generated from received print data.

The communication interface 54 receives print data from a personal computer or the like connected to the network and processes the print data to obtain image data. The communication interface 54 sends the image data to the image forming device 14.

Figure 5:
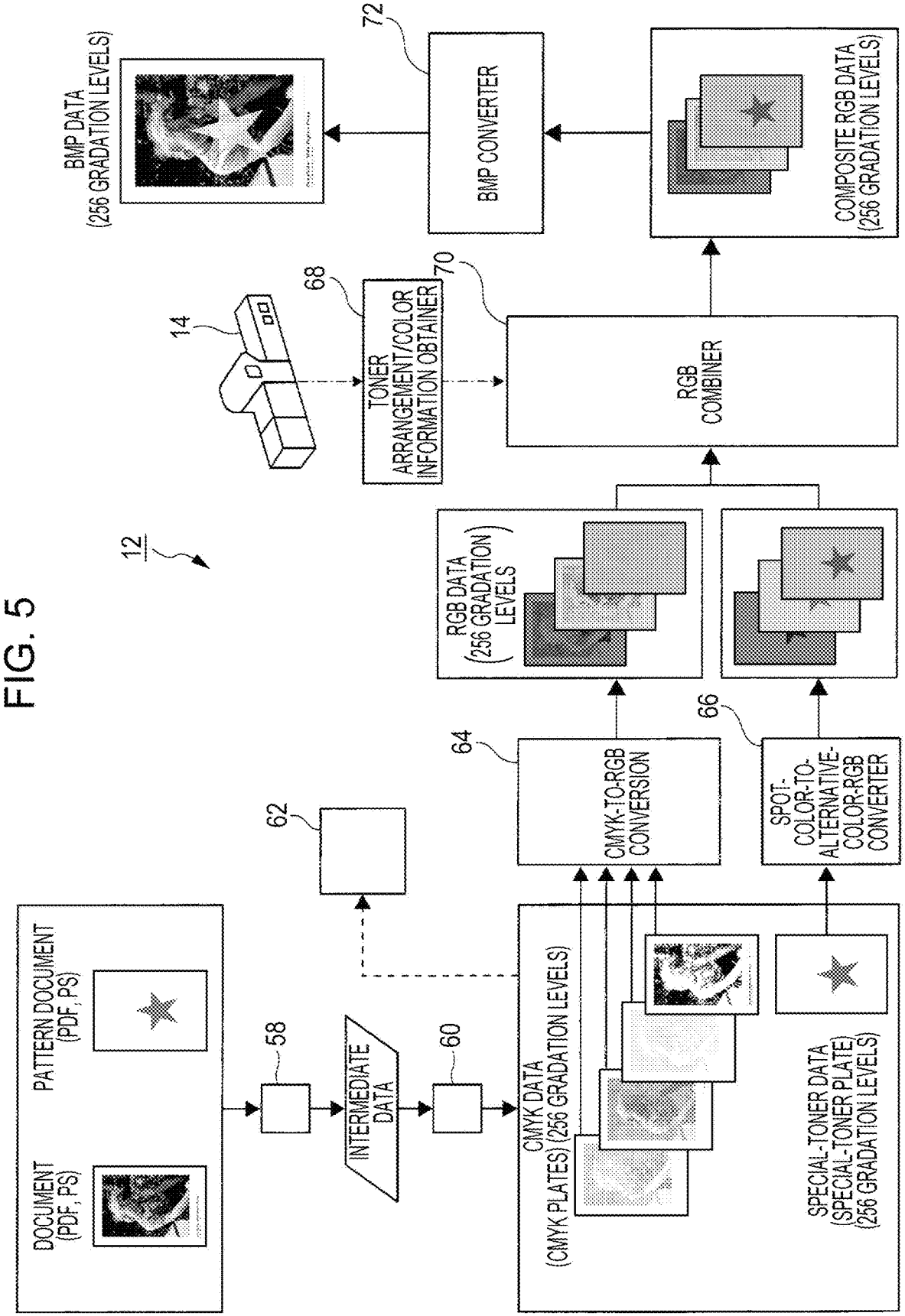
FIG. 5 is a functional configuration diagram describing functions of the server according to a first exemplary embodiment of the present invention.

FIG. 5 illustrates a functional configuration of the server 12 according to a first exemplary embodiment.

The functions of the server 12 may be implemented by software, or some or all of the functions may be implemented by hardware.

An intermediate data generator 58 accepts print data including a document and a pattern document, which are written in a page description language (PDL) such as Portable Document Format (PDF) or PostScript, and generates intermediate data from the accepted print data.

An intermediate data processor 60 converts the intermediate data generated by the intermediate data generator 58 into print data for output (for example, bitmap data) that can be subjected to raster scanning. The document is used to generate basic-color CMYK data (CMYK plates) having 256 gradation levels, for example, and the pattern document is used to generate special-toner data (special-toner plate) having 256 gradation levels, for example.

The document and the pattern document may be converted into raster data without being converted into intermediate data.

The special-toner plate may be rasterized by the intermediate data processor 60 or may be generated by determining the presence of a colored portion or generated based on a tag plate.

A print executor 62 sends the CMYK plates and the special-toner plate, which are rasterized by the intermediate data processor 60, to the image forming device 14 so that the image forming device 14 uses the CMYK plates and the special-toner plate for printing.

A first converter 64 receives the CMYK data from the intermediate data processor 60 and converts the CMYK data into RGB (red, green, blue) data.

The conversion from the CMYK data to the RGB data may be performed using a look-up table, as known in the art.

A second converter 66 receives the special-toner data from the intermediate data processor 60 and converts the special-toner data into RGB data as alternative colors.

Each of the alternative colors also has density levels in accordance with the gradation of the special-toner plate.

For example, for gold toner, the following values are obtained.

R=0xB8 to 0xFF (48 gradation levels)
G=0x9A to 0xFF (66 gradation levels)
B=0x3E to 0xFF (193 gradation levels)

For example, R is calculated in accordance with grayscale as follows.

$$R=0x+(0xFF-0xBS)\times(1-ST \text{ gray value}/0xFF),$$

where 0x denotes hexadecimal and the ST gray value is a gradation value in grayscale.

The conversion from the special-toner data to the RGB data may be performed using a look-up table, as known in the art.

A toner state obtainer 68 obtains information on the arrangement and colors of toners from the image forming device 14. The information on the arrangement and colors of the toners is obtained by, for example, reading ID information that is embedded in each of the toner containers described above to identify the corresponding toner.

A combiner 70 combines the basic-color RGB data obtained by the first converter 64 with the special-color RGB data obtained by the second converter 66 to create composite data. In this combining operation, the composite data is adjusted in accordance with the information on the arrangement and colors of the toners, which is obtained by the toner state obtainer 68.

A bitmap converter 72 converts the composite RGB data, which is created by the combiner 70, into bitmap (BMP) data and displays a resulting image on the display device 17 described above.

Figure 6:
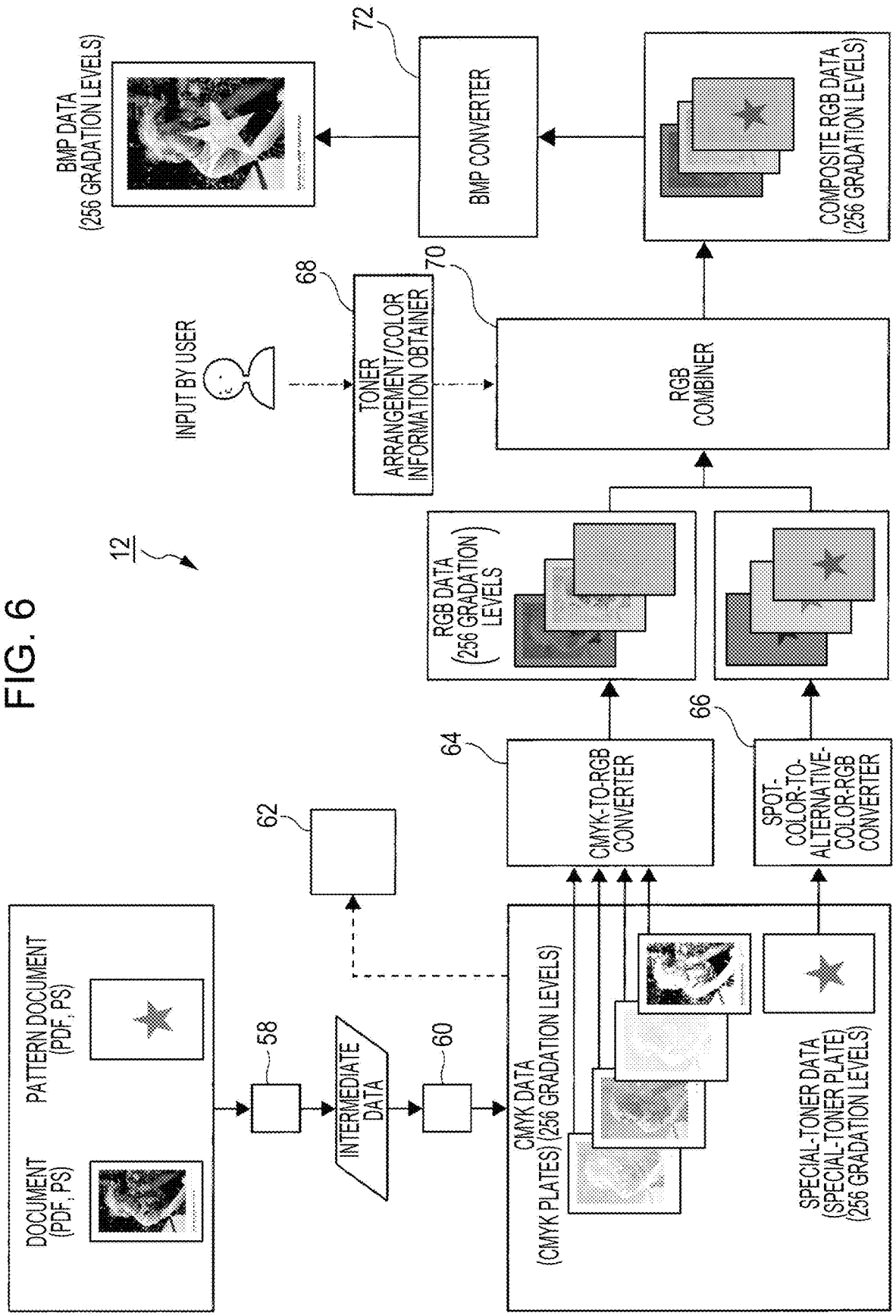
FIG. 6 is a functional configuration diagram describing functions of the server according to a second exemplary embodiment of the present invention.

FIG. 6 illustrates a functional configuration of the server 12 according to a second exemplary embodiment.

In the first exemplary embodiment, the toner state obtainer 68 obtains a toner state from the image forming device 14, whereas in the second exemplary embodiment, a user inputs a toner state. In the second exemplary embodiment, since a toner state is input by a user, what is the final color is displayed on the display device 17 without toner replacement.

Figure 7:
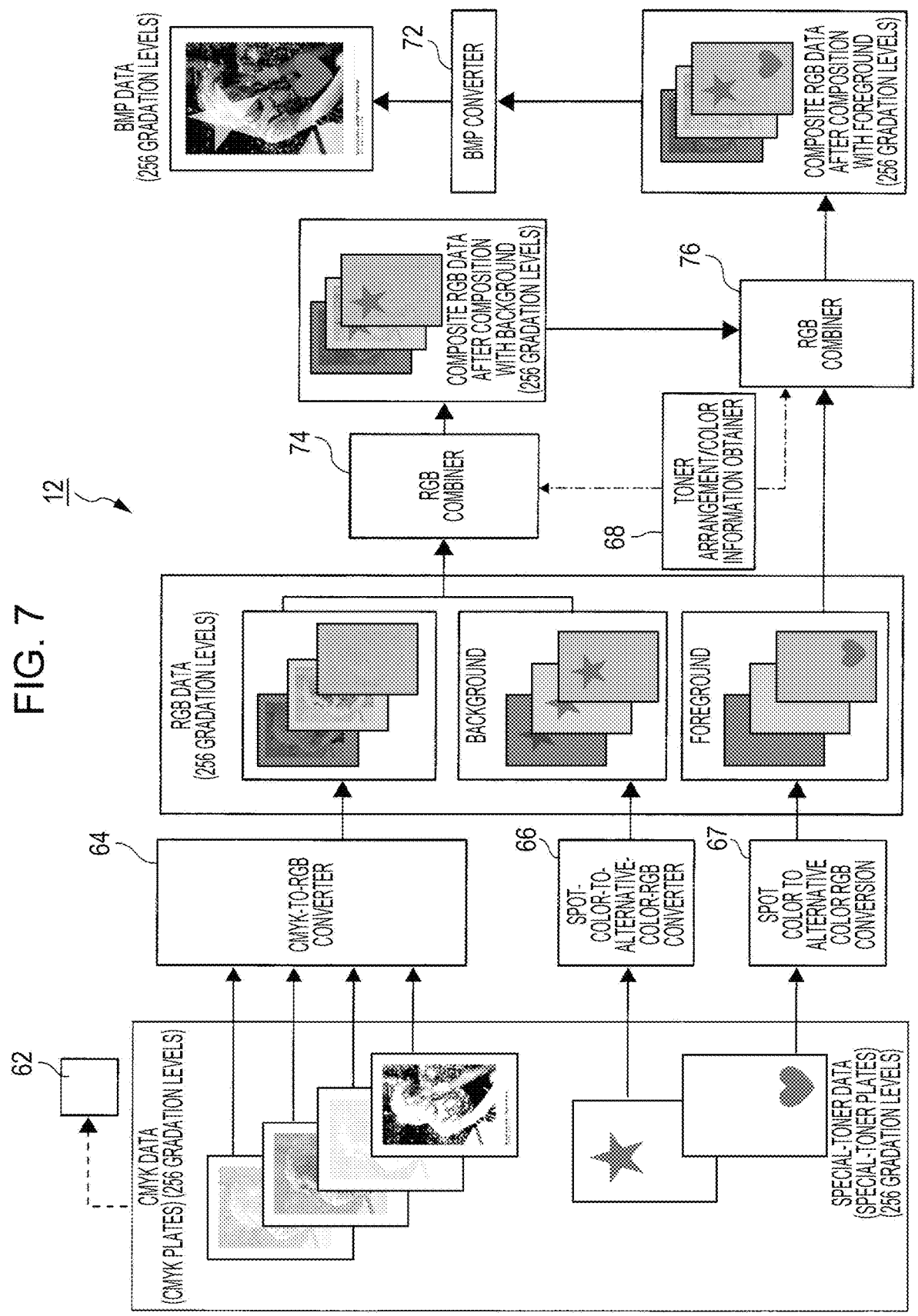
FIG. 7 is a functional configuration diagram describing functions of the server according to a third exemplary embodiment of the present invention.

FIG. 7 illustrates a functional configuration of the server 12 according to a third exemplary embodiment.

In the third exemplary embodiment, unlike the first and second exemplary embodiments, two special colors are used.

Specifically, first special-toner data (first special-toner plate) is converted into RGB data as an alternative color by the second converter 66, and second special-toner data (second special-toner plate) is converted into RGB data as an alternative color by a third converter 67. Upon receipt of information from the toner state obtainer 68 indicating that the first special-toner plate is used in the background, a first combiner 74 combines the RGB data of the basic colors with the RGB data of the special color identified by the first special-toner plate. Upon receipt of information from the toner state obtainer 68 indicating that the second special-toner plate is used in the foreground, a second combiner 76 combines the composite RGB data obtained by the first combiner 74 with the RGB data of the special color identified by the second special-toner plate. Composite RGB data obtained by the second combiner 76 is converted into bitmap data by the bitmap converter 72, and a resulting image is displayed on the display device 17.

Next, the combiner 70 will be described in detail. The first combiner 74 and the second combiner 76 perform operations similar to the operation performed by the combiner 70.

The combiner 70 performs a combining operation by using alpha blending, for example. Alpha blending is a method for composition of multiple images using an α value.

The general formula for alpha blending is as follows:

$$C = (1-\alpha) \times C_{src} + \alpha \times C_{dst}$$

where C denotes a color value after composition, $C_{src}$ denotes the color value of basic colors before composition, and $C_{dst}$ denotes the color value of a special color before composition.

In the above formula, α represents the degree of transparency during composition. The α value is assumed to differ depending on the amount of special toner to be applied $G_{sp}$. The amount of special toner to be applied $G_{sp}$ is set in accordance with the gradation (or density) of the special color.

Given that $\alpha = G_{sp}/255$, RGB values $(C_R, C_G, C_B)$ after composition are represented by the following formulas:

$$\begin{cases} C_R = (1 - G_{sp}/255) \times C_{pr\_R} + G_{sp}/255 \times C_{sp\_R} \\ C_G = (1 - G_{sp}/255) \times C_{pr\_G} + G_{sp}/255 \times C_{sp\_G} \\ C_B = (1 - G_{sp}/255) \times C_{pr\_B} + G_{sp}/255 \times C_{sp\_B} \end{cases}$$

where $C_x$ denotes a color value after composition (ranging from 0 to 255), $C_{pr\_x}$ denotes the color value of basic colors (ranging from 0 to 255), $C_{sp\_x}$ denotes the color value of a special color (ranging from 0 to 255), and $G_{sp}$ denotes the amount of special toner to be applied (ranging from 0 to 255).

In the exemplary embodiments, further multiplication by a coefficient k (ranging from 0 to 1), which differs depending on the color or arrangement of the special toner, reproduces a difference in color or arrangement.

Given that $\alpha = k \times G_{sp}/255$, RGB values $(C_R, C_G, C_B)$ after composition are represented by the following formulas:

$$\begin{cases} C_R = (1 - k \times G_{sp}/255) \times C_{pr\_R} + k \times G_{sp}/255 \times C_{sp\_R} \\ C_G = (1 - k \times G_{sp}/255) \times C_{pr\_G} + k \times G_{sp}/255 \times C_{sp\_G} \\ C_B = (1 - k \times G_{sp}/255) \times C_{pr\_B} + k \times G_{sp}/255 \times C_{sp\_B} \end{cases}$$

FIG. 8 illustrates examples of the coefficient k.

A special color assigned a smaller coefficient k has a higher degree of transparency. In the foreground, for example, gold is assigned a coefficient $k_G$ of 0.9 ($k_G$=0.9) and clear color is assigned a coefficient $k_{CL}$ of 0.5 ($k_{CL}$=0.5). In this case, even if the amount of gold toner to be applied and the amount of clear toner to be applied are the same, a clear color portion has a higher degree of transparency, through which a basic color portion image can be seen.

A further specific example is given as follows.

If the following conditions are set:

RGB values of basic colors $(C_{pr\_R}, C_{pr\_G}, C_{pr\_B})$=(51, 153, 255)

RGB values of gold $(C_{sp\_R}, C_{sp\_G}, C_{sp\_B})$=(230, 180, 34)

amount of gold toner to be applied $G_{sp}$=204 (with the maximum value being 255), a composite color obtained when gold toner is used in the foreground is calculated by the following formulas:

$$\begin{cases} C_R = (1 - 0.9 \times 204/255) \times 51 + 0.9 \times 204/255 \times 230 \\ C_G = (1 - 0.9 \times 204/255) \times 153 + 0.9 \times 204/255 \times 180 \\ C_B = (1 - 0.9 \times 204/255) \times 255 + 0.9 \times 204/255 \times 34 \end{cases}$$

Thus, RGB values $(C_R, C_G, C_B)$ after composition are (183, 146, 61).

When gold toner is used in the background, RGB values $(C_R, C_G, C_B)$ after composition are (106, 89, 36).

When two special colors are used, the basic colors and one of the special colors which is behind the basic colors are combined, and then the resulting composite color is further combined with the other special color, which is in front of the basic colors.

For example, gold and silver are respectively used in the background and the foreground and the basic colors are arranged between gold and silver. In this case, the results are as follows.

$$\begin{cases} \text{RGB values after gold background is} \\ \text{combined with process colors } (C_R, C_G, C_B) = (106, 89, 36) \\ \text{RGB values of silver toner } (C_{sp\_R}, C_{sp\_G}, C_{sp\_B}) = (192, 192, 192) \\ \text{Amount of special toners to be applied } G_{sp} = 204 \\ \text{Coefficient for gold in background } k_{GLD\_B} = 0.6 \\ \text{Coefficient for silver in foreground } k_{SLV\_F} = 0.9 \end{cases}$$

$$\begin{cases} C_R = (1 - 0.9 \times 204/255) \times 106 + 0.9 \times 204/255 \times 192 \\ C_G = (1 - 0.9 \times 204/255) \times 89 + 0.9 \times 204/255 \times 192 \\ C_B = (1 - 0.9 \times 204/255) \times 36 + 0.9 \times 204/255 \times 192 \end{cases}$$

Thus, RGB values $(C_R, C_G, C_B)$ after composition are (147, 145, 141).

FIG. 9A illustrates a preview screen displayed when silver toner is used in the foreground. FIG. 9B illustrates a preview screen displayed when silver toner is used in the background. While the same amount of silver toner to be applied is used for the foreground and the background, the coefficient k is smaller when silver toner is used in the background than when silver toner is used in the foreground. This indicates that an image is displayed in such a manner that the silver toner used in the background is less influential. Toner arrangement information is obtained from a printer, and the coefficient k is changed in accordance with the positional relationship with the process colors. Here, toner arrangement information obtained from a printer is used to determine a coefficient k. Alternatively, the coefficient k during composition may be changed by a user specifying the color or arrangement of a special toner.

FIG. 10A illustrates a preview screen displayed when silver toner is used in the foreground. FIG. 10B illustrates a preview screen displayed when clear toner is used in the foreground. While the amounts of the toners to be applied are the same, the coefficient k is smaller when clear toner is used in the foreground than when silver toner is used in the foreground. This indicates that an image is displayed in such a manner that the special toner is less influential.

Figure 11:
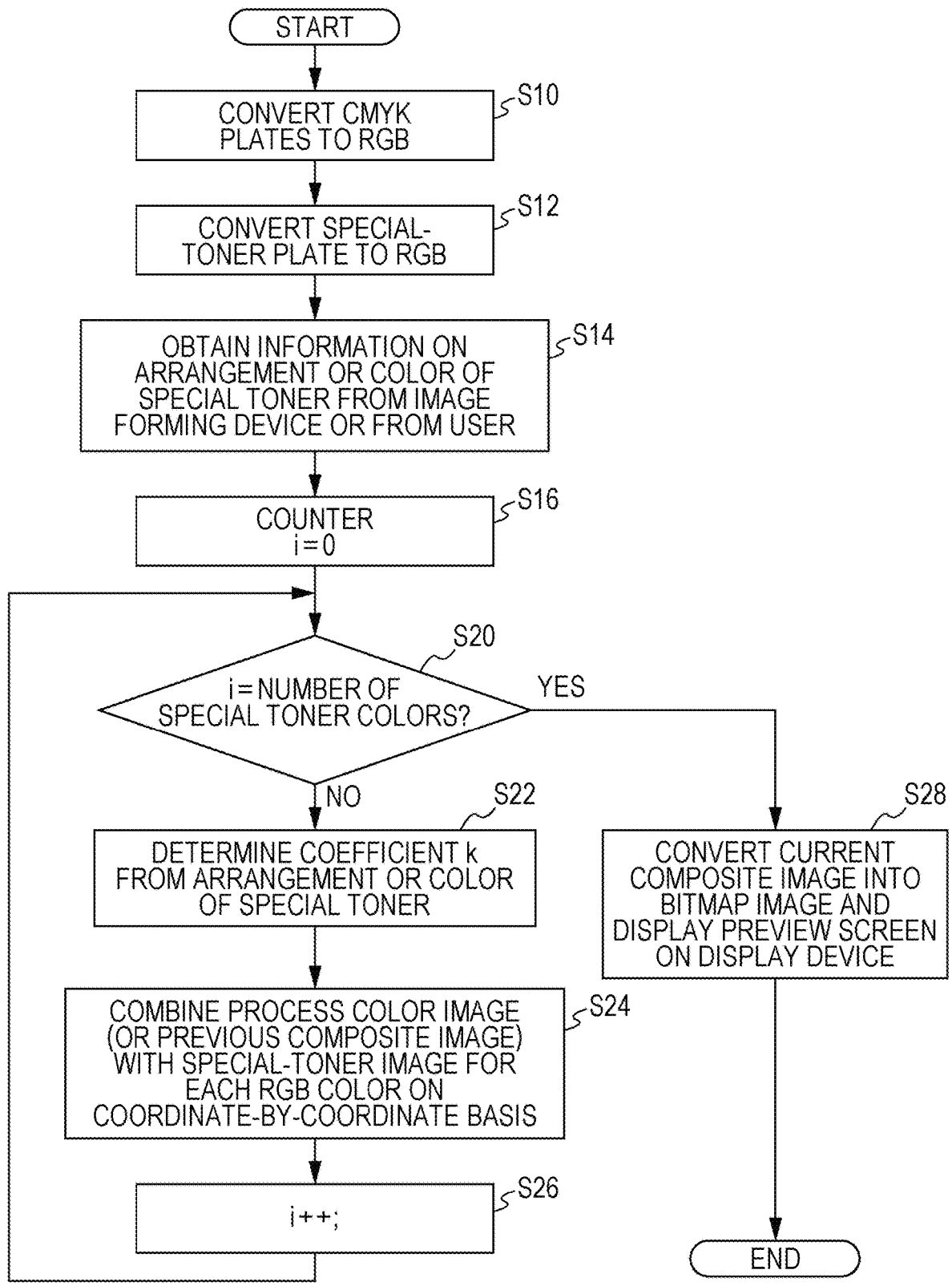
FIG. 11 is a flowchart illustrating an example operation of controlling a display device according to the exemplary embodiments of the present invention.

FIG. 11 is a flowchart illustrating processing performed by the server 12 whose functions are implemented by software.

First, in step S10, the server 12 converts CMYK plates of an accepted document into RGB. Then, in step S12, the server 12 also converts a special-toner plate of an accepted pattern document into RGB. RGB may have gradation levels or may be binary representation. The α value to be used later provides density levels. As described above, the special-toner plate may be rasterized in accordance with an accepted job or may be generated based on the characteristics of an area (such as a colored portion or a photographic portion) in the special-toner plate.

Then, in step S14, the server 12 obtains information on the arrangement or color of a special toner which is included in information from the image forming device 14, as illustrated in the first and third exemplary embodiments, or is included in information input from the user, as illustrated in the second exemplary embodiment.

Then, in step S16, the server 12 sets a counter i to 0 (i=0). Then, the process proceeds to step S20. In step S20, the server 12 determines whether the count of the counter i is equal to the number of special toner colors. That is, if the number of special toner colors is one, the server 12 determines whether the count of the counter i is 1 (i=1), and if the number of special toner colors is two, the server 12 determines whether the count of the counter i is 2 (i=2).

If it is determined in step S20 that the count of the counter i is not equal to the number of special toner colors, the process proceeds to step S22. In step S22, the server 12 determines a coefficient k from the arrangement or color of the special toner, which is obtained in step S14. The coefficient k is set in advance in the way illustrated in FIG. 8, for example, as described above.

Then, in step S24, the server 12 combines a basic color image or the previous composite image with a special-toner image for each RGB color on a coordinate-by-coordinate basis. Here, the images are combined sequentially, starting from the special-toner plate used in the background.

After the processing of step S24, in step S26, the server 12 increments the counter i. Then, the process returns to step S20. If it is determined in step S20 that the count of the counter i is equal to the number of special toner colors, the process proceeds to step S28. In step S28, the server 12 converts the current composite image into a bitmap image and displays a preview screen on the display device 17. Then, the process ends.

While the exemplary embodiments have been described in the context of xerographic printing, the exemplary embodiments may also be applied to any other type of printing, for example, inkjet printing.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A display device comprising:
    an obtainer that obtains information on at least one special color to be printed, the information being information on the at least one special color with respect to at least one basic color; and
    a display controller that:
        (1) performs control to display a portion where the at least one special color is to be printed in accordance with a color value corresponding to a degree of transparency obtained from the information on the at least one special color, which is obtained by the obtainer, and
        (2) adjusts the degree of transparency for the at least one special color to be lower when the at least one special color is to be printed behind the at least one basic color than when the at least one special color is to be printed in front of the at least one basic color.

2. The display device according to claim 1, wherein the obtainer obtains a density of the at least one special color.

3. The display device according to claim 1, wherein the display controller adjusts the degree of transparency for the at least one special color to be higher when the at least one special color is to be printed in front of the at least one basic color than when the at least one special color is to be printed behind the at least one basic color.

4. The display device according to claim 1, wherein the display controller adjusts the degree of transparency for the at least one special color in accordance with color information of the at least one special color.

5. The display device according to claim 1, wherein the display controller includes
    a basic color converter that converts color data of the at least one basic color into RGB data,
    a special color converter that converts data of the at least one special color into RGB data, and
    a combiner that combines the RGB data of the at least one basic color, which is obtained by the basic color converter, with the RGB data of the at least one special color, which is obtained by the special color converter, by using the degree of transparency for the at least one special color.

6. The display device according to claim 1, wherein the display controller adjusts the degree of transparency for the at least one special color in accordance with information on an arrangement of the at least one special color with respect to the at least one basic color.

7. A printing system comprising:
    a printer that prints an image on a recording medium; and
    a display device that displays an image to be printed by the printer,
    the display device including
        an obtainer that obtains information on at least one special color to be printed, the information being information on the at least one special color with respect to at least one basic color, and
        a display controller that:
            (1) performs control to display a portion where the at least one special color is to be printed in accordance with a color value corresponding to a degree of transparency obtained from the information on the at least one special color, which is obtained by the obtainer, and (2) adjusts the degree of transparency for the at least one special color to be lower when the at least one special color is to be printed behind the at least one basic color than when the at least one special color is to be printed in front of the at least one basic color.

8. A non-transitory computer readable medium storing a program causing a computer to execute a process for display, the process comprising:

obtaining information on at least one special color to be printed, the information being information on the at least one special color with respect to at least one basic color;

performing control to display a portion where the at least one special color is to be printed in accordance with a color value corresponding to a degree of transparency obtained from the obtained information on the at least one special color; and adjusting the degree of transparency for the at least one special color to be lower when the at least one special color is to be printed behind the at least one basic color than when the at least one special color is to be printed in front of the at least one basic color.

* * * * *